UNITED STATES PATENT OFFICE.

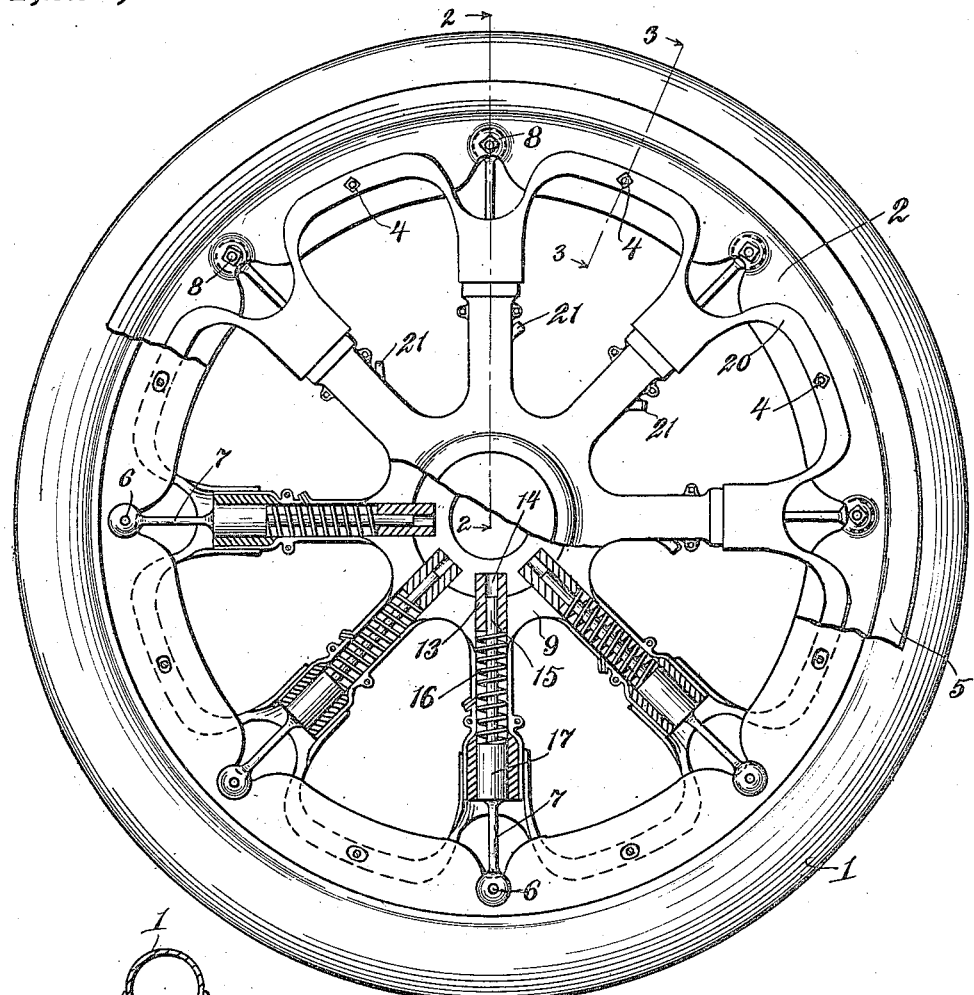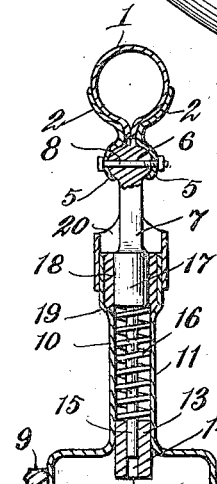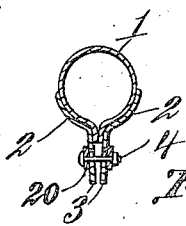

SOLOMON THOMAS, OF NEAR NEW CAMBRIA, MISSOURI, ASSIGNOR OF ONE-HALF TO N. A. BALDING, CALVIN ELAM, AND J. J. WILLIAMS, ALL OF ETHEL, MISSOURI.

VEHICLE-WHEEL.

1,224,429.

Specification of Letters Patent.

Patented May 1, 1917.

Application filed August 12, 1915. Serial No. 45,268.

*To all whom it may concern:*

Be it known that I, SOLOMON THOMAS, a citizen of the United States, residing near New Cambria, in the county of Macon and State of Missouri, have invented a new and useful Vehicle-Wheel for Automobiles, Motor-Cycles, Carriages, &c., of which the following is a specification.

This invention relates to certain new and useful improvements in resilient wheels of that general class embodying a rim or tire with flexible spokes, providing a wheel possessing all the desired or requisite characteristics of a wheel of the pneumatic tire type without the liability of puncture, blowouts, etc., as well as avoiding the extra expense incident to the upkeep of pneumatic tires.

The present invention has for its objects among others to provide a wheel of this type possessing great strength with maximum resiliency, thus insuring smooth and comfortable running of the automobile while reducing to a minimum the wear and tear of the parts.

It has for a further object to provide a wheel with a hollow steel tire constructed to take the sudden strain off the engine and gearing in starting and stopping the car, as well as when it strikes an object where compression is liable to ensue.

It has for a further object to provide a wheel of this general character which can be manufactured at small cost and in which all the parts are interchangeable.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is an elevation with portions broken away and parts in section of a wheel constructed in accordance with my present invention.

Fig. 2 is a section on the line 2—2 of Fig. 1 looking in the direction of the arrows.

Fig. 3 is a section on the line 3—3 of Fig. 1 looking in the direction of the arrows.

Like numerals of reference indicate like parts in the several views.

Referring to the drawings, 1 designates a compressed steel hollow tube tire received within the rim 2 which is made of two like parts, as seen in Figs. 2 and 3, the flanges 3, 3 of which are secured together by bolts or the like 4 between each two adjacent spokes, and intermediate these connections the flanges of the rim are outwardly curved, as seen at 5 in Fig. 2, and receive between them the ball-shaped ends 6 of the steel springs 7, bolts or the like 8 being employed, as seen clearly in Fig. 2, to secure these curved flanges and the ball ends of the springs in place.

9 designates the hub, affixed to which are a series of radially arranged webs 10 on the inner lateral half and extending outward from the hub, while the outer webs 11 are not fixed with the hub, but are held thereon by means of the cap 12, as seen in Fig. 2. The webs continue outwardly, forming a wheel divided into two like parts along a plane at right angles to its axis. In the space between these webs there are formed elongated cylindrical spaces within which are disposed the elements now to be described.

As the elements constituting each spoke are the same, a description of one will suffice for all. Within each cylindrical space formed between the webs 10 and 11 is a smoothly machined head 13 having an axial bore 14 within which is mounted to reciprocate the stem 15 around which is a spring 16 of any suitable form bearing at one end against the head 13 and at the other end against a plunger 17 arranged within a bushing or the like 18 in the expanded portion 19 formed between the webs 10 and 11 and which plunger 17 carries the steel springs 7, as seen clearly in Figs. 1 and 3.

The plunger 17 allows the stem to move in and out, but serves to limit its outward travel, thus holding the spring under pressure at all times to prevent rattling, looseness or noise.

The wheel can move in any direction except from side to side, being strengthened by the lateral webs which are secured at the hub. The outer parts of the lateral or outer surrounding webs form lateral guides which slide radially and circumferentially on the flanges of the rim, forming a steady support, the webs being so slotted as to allow freedom of movement of the bolts 4 and consequent relative movement of the webs and rim. On coming in contact with an object or an obstruction, as a high plank in a bridge, the lateral guides will slide up along the flanges of the rim and the recess in the guides 20 receives the ball 6 of the outer end of the steel spring 7, it being understood that the parts 20 are continuations of the webs 10 and 11.

The wheel is preferably of all metal and the entire rim portion is yieldingly supported on the inner or hub portion, ample resiliency for the load carried upon the axle being provided for by the use of the springs 7 and the coil spring 16. The latter receives and opposes the direct radial inward thrust of the stems, while the springs 7 bend backward and forward upon lines parallel with the circumference of the wheel.

The lateral surrounding webs serve to always keep the wheel in proper alinement in case of sudden strain being placed on the wheel sidewise, as turning a corner at rapid speed. The lateral guides 20, seen clearly in Fig. 1, have their outer ends continuous with each other and may be lined with asbestos, if desired, to eliminate noise.

Suitable oil cups, as seen at 21, may be employed for lubricating the steel coil springs, the plungers and the heads.

Modifications in detail may be resorted to without departing from the spirit of the invention or sacrificing any of its advantages.

What is claimed as new is:—

1. In a resilient wheel, a hub, a web rigid therewith, a second web detachably secured to the hub, a head in the space between said webs, a stem guided in said head, a spring around the stem, a plunger bearing against the other end of said spring, a flexible member connected with the plunger, a flanged rim, a ball and socket connection between said flexible member and rim, and lateral guide members at the rim rigid with and continuations of said webs of the hub and embracing the rim.

2. In a resilient wheel, a hub, webs radiating therefrom, spring members in the spaces between the webs, flexible members operatively connected with said spring members, an outer rim, ball and socket connections between the same and the flexible members and lateral guide members at the rim rigid with and continuations of said webs and engageable with the rim.

3. A resilient wheel comprising a hub having affixed thereto a series of radially arranged webs with elongated cylindrical spaces therebetween, a head in each cylindrical space having an axial bore, a stem reciprocable in said bore, a spring bearing at one end against said head, a plunger contacting with the other end of said spring, a bushing in an expanded portion between said webs, a steel spring carried by said plunger, peripheral lateral guide members continuous of said webs and of each other, an outer rim embraced by said lateral guide members, and a ball and socket connection between the outer end of said spring and the outer rim.

SOLOMON THOMAS.

Copies of this patent may be obtained for five cents each, by addressing the "Commissioner of Patents, Washington, D. C."